United States Patent
Mitchell et al.

(10) Patent No.: US 7,567,990 B2
(45) Date of Patent: Jul. 28, 2009

(54) TRANSFERING DATABASE WORKLOAD AMONG MULTIPLE DATABASE SYSTEMS

(75) Inventors: Mark A. Mitchell, Plano, TX (US); Thomas A. Fastner, Pleasant Hill, CA (US)

(73) Assignee: Teradata US, Inc., Miamisburg, OH (US)

( * ) Notice: Subject to any disclaimer, the term of this patent is extended or adjusted under 35 U.S.C. 154(b) by 223 days.

(21) Appl. No.: 11/638,647

(22) Filed: Dec. 13, 2006

(65) Prior Publication Data

US 2007/0094238 A1    Apr. 26, 2007

Related U.S. Application Data

(63) Continuation-in-part of application No. 11/266,927, filed on Nov. 4, 2005, now abandoned, which is a continuation-in-part of application No. 11/027,897, filed on Dec. 30, 2004, now abandoned.

(51) Int. Cl.
G06F 17/00    (2006.01)
(52) U.S. Cl. .................................. 707/202; 707/200
(58) Field of Classification Search ................... None
See application file for complete search history.

(56) References Cited

U.S. PATENT DOCUMENTS

| | | | |
|---|---|---|---|
| 5,884,325 A | 3/1999 | Bauer et al. | |
| 5,926,808 A | 7/1999 | Evans et al. | |
| 5,937,415 A | 8/1999 | Sheffield et al. | |
| 6,012,067 A | 1/2000 | Sarkar | |
| 6,202,149 B1 | 3/2001 | Hedegard | |
| 6,263,433 B1 | 7/2001 | Robinson et al. | |
| 6,292,800 B1 | 9/2001 | Eldreth | |
| 6,366,915 B1 | 4/2002 | Rubert et al. | |
| 6,516,327 B1 | 2/2003 | Zondervan et al. | |
| 6,629,266 B1 * | 9/2003 | Harper et al. | 714/38 |
| 7,130,924 B2 * | 10/2006 | Bartlett et al. | 709/245 |
| 7,243,093 B2 | 7/2007 | Cragun et al. | |
| 2002/0023070 A1 * | 2/2002 | Branch et al. | 707/1 |
| 2004/0220934 A1 * | 11/2004 | Dearing et al. | 707/9 |
| 2005/0055385 A1 | 3/2005 | Sinha et al. | |
| 2006/0277413 A1 * | 12/2006 | Drews | 713/189 |
| 2008/0072000 A1 * | 3/2008 | Osaki et al. | 711/162 |

* cited by examiner

Primary Examiner—Uyen T. Le
(74) Attorney, Agent, or Firm—John D. Cowart

(57) ABSTRACT

A system includes at least two database systems that both store a common portion of a relational database and that are configured to share in execution of a database workload against that relational database. The system also includes a system-management component configured to receive indication that a first one of the database systems is ceasing operation and, in response, take a second one of the database systems to an operational state in which at least a portion of the database workload that is scheduled to be carried out by the first database system is transferred to the second database system.

6 Claims, 10 Drawing Sheets

VERTICAL PARTITIONING

HORIZONTAL PARTITIONING

TRANSFERING DATABASE WORKLOAD AMONG MULTIPLE DATABASE SYSTEMS

CROSS-REFERENCE TO RELATED APPLICATIONS

This application is a continuation-in-part of U.S. patent application Ser. No. 11/266,927, filed on Nov. 4, 2005, which is a continuation-in-part of U.S. patent application Ser. No. 11/027,897, filed on Dec. 30, 2004, both by Mark A. Mitchell and Thomas A. Fastner, and titled "Controlling State Transitions in Multiple Active Database Systems," and both now abandoned.

BACKGROUND

The database industry today is seeing rapidly increasing demand for database systems that are increasingly large in complexity and size, both in terms of the hardware and software components that make up the database systems, the data that populates the systems, and the queries that the systems are asked to execute. The industry is also seeing a desire from certain types of database users, such as large retailers and telecommunications companies, in keeping multiple copies of a single database system available for active use for the purpose of protecting against planned and unplanned outages, as well as allowing cross-system workload balancing. Unfortunately, the database systems available today were not designed with multiple-active use in mind and, as a rule, are ill-equipped to allow for use in a multiple-active environment.

SUMMARY

Described below are a tool and a technique for use in managing operation of at least two database systems that both store a common portion of a relational database and that are configured to share a database workload against that relational database. The technique involves receiving indication that a first one of the database systems is ceasing operation and, in response, taking a second one of the database systems to an operational state in which at least a portion of the database workload that is scheduled to be carried out by the first database system is transferred to the second database system.

In some embodiments, the technique also involves taking the second database system to a second operational state in which it carries out the portion of the database workload transferred to it in addition to at least some portion of its own portion of the database workload. The technique also often involves receiving indication that the first database system is resuming operation and, in response, taking the second database system to a third operational state in which at least a portion of the transferred workload is transferred back to the first database system. The technique then often involves taking the second database system to an operational state in which the first and second database systems again share the database workload.

In certain embodiments, receiving indication that the first database system is ceasing operation involves receiving indication that the first database is ceasing operation as a result of a planned shutdown. In other embodiments, receiving indication that the first database system is ceasing operation includes receiving indication that the first database is ceasing operation as a result of an unplanned shutdown, such as the result of a system failure. When an unplanned shutdown occurs, the technique often involves taking the second database system to a second operational state in which it (a) carries out the portion of the database workload transferred to it in addition to at least some portion of its own portion of the database workload and treats the first database system as though it ceased operation as a result of an unplanned shutdown, and then (b) taking the second database system to a third operational state in which it continues to carry out the portion of the database workload transferred to it in addition to at least some portion of its own portion of the database workload and treats the first database system as though it ceased operation as a result of a planned shutdown. When the first database system is later able to resume operation, the technique typically involves taking the second database system to a fourth operational state in which at least a portion of the transferred workload is transferred back to the first database system and then to an operational state in which the first and second database systems again share the database workload.

Other features and advantages will become apparent from the description and claims that follow.

DETAILED DESCRIPTION

Figure 1:
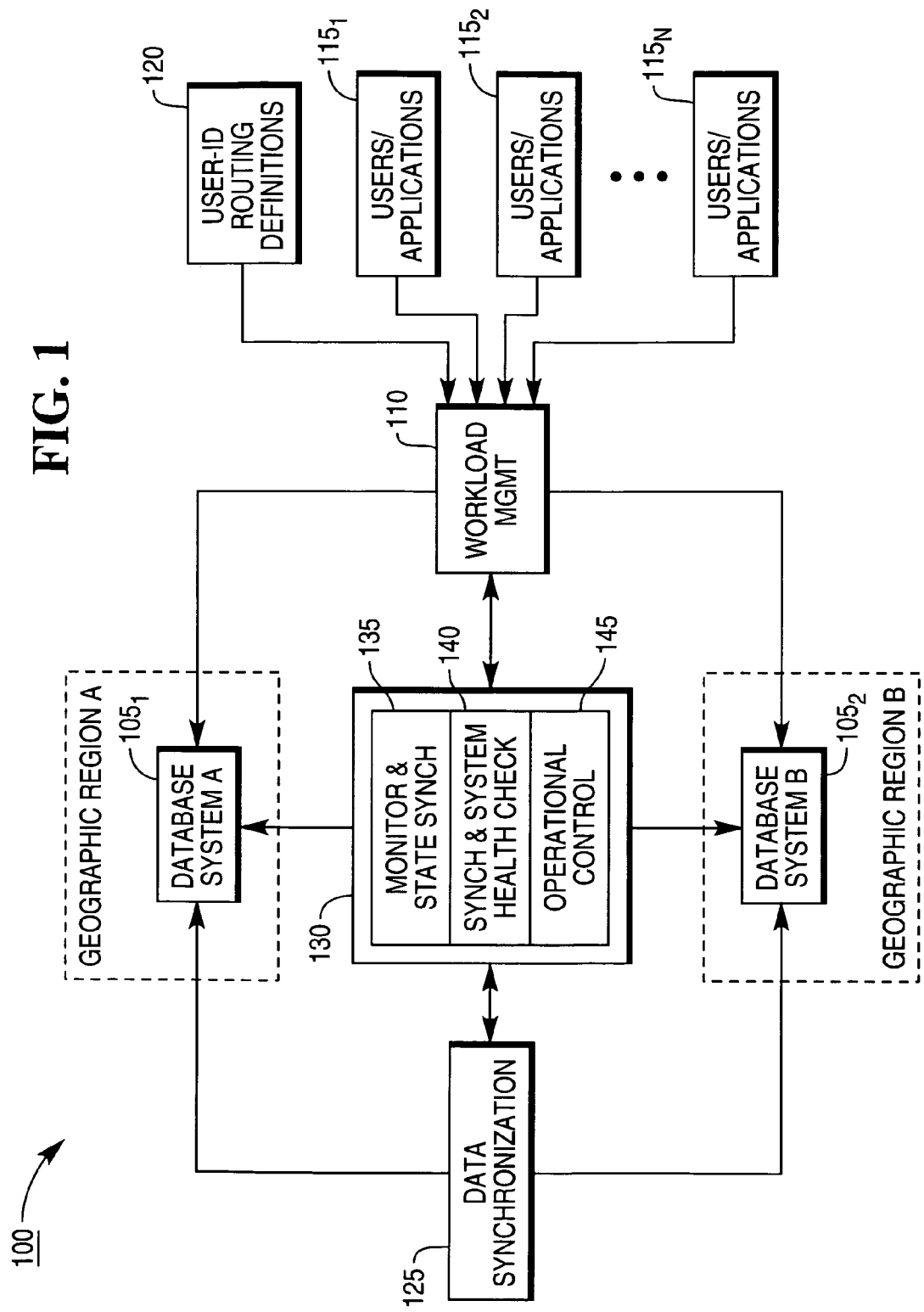
FIG. 1 is a schematic diagram showing a multiple-active environment for maintaining two duplicate (or near-duplicate) and active database systems.

FIG. 1 shows a multiple-active data-warehousing system (or "multiple-active system") 100 in which two similar database systems $105_{1-2}$—System A and System B—are active and available to process queries from one or more users $115_{1...N}$. The database systems $105_{1-2}$ execute these queries against a database that is maintained, at least in part, on both of the database systems $105_{1-2}$. The dual database systems $105_{1-2}$ are, in most implementations, located at two distinct geographic locations, often very distant from each other (e.g., one in New York and one in San Francisco) and typically separated by enough physical distance (e.g., in separate building structures) to ensure that trauma suffered by one of the database systems is not experienced by the other. The users $115_{1...N}$ are also often distributed among many separate locations.

The key problem in building and maintaining a multiple-active system 100 like the one shown here lies in providing high availability for mission-critical applications. The multiple-active system 100 must ensure that loads and updates to the database as stored in one of the database systems $105_{1-2}$ are duplicated in the other system, and it must do so in a timely manner to ensure that identical queries run against the two systems receive answer sets that are also identical (or sufficiently close for the application involved). The multiple-active system 100 must also balance the workloads of the two database systems $105_{1-2}$ to ensure optimal performance of each.

The multiple-active system 100 shown here includes several key components to achieve these ends. The first of these components is a workload-management facility 110 that, among other things, receives database-access requests from originating sources and routes each of these requests to the appropriate one of the database systems $105_{1-2}$. The workload-management facility 110 also serves to re-route requests from one database system to another, such as when one of the database systems $105_{1-2}$ fails or is taken down for maintenance or cannot process an incoming database query for any one of a variety of other reasons (e.g., the database system does not contain some object, such as a table, view, or macro, required to answer the query, or the system is locked for this type of request).

A wide variety of workload-management techniques are available for use by the workload-management facility 110. The most common technique, however, (and perhaps the easiest to implement) involves the use of a routing definition 120 that maps valid connections for each of the user IDs or account IDs associated with the various users or account holders to the two database systems $105_{1-2}$. With this approach, on receiving a request from a user or account holder, the workload-management facility 110 needs only look up the associated user ID or account ID in the map and route the request accordingly. Request routing and workload management are described in more detail below.

Another key component of the multiple-active system 100 is the data-synchronization (or "data-sync") facility 125. The primary role of the data-sync facility 125 is the synchronization of data between the two database systems $105_{1-2}$ at the table or row level. In general, the data contained in the two database systems $105_{1-2}$ is kept in synch through the use of a dual-load utility, i.e., a data-load utility that loads data from its originating source into the database copies stored in both of the database systems $105_{1-2}$ in like manner. From time to time, however, the data stored in one of the database systems $105_{1-2}$ will change, and the data-sync facility 125 must cascade the changes to the other system. As described in more detail below, the data-sync facility 125 is designed (a) to synchronize table-level data from time-to-time according to some set synchronization schedule or as events dictate, and (b) to synchronize data on the row level by capturing changes made when certain row-level actions (such as INSERT, DELETE, and UPDATE actions) are performed on one system, then cascading these changes to the other system. The technique by which the data-sync facility 125 cascades changes from one of the database system to the other depends a variety of factors, including table size, frequency of changes, and system-availability requirements, to name just a few.

Another key component is the administration facility 130, which, among other things, manages interaction among the database systems $105_{1-2}$ and the workload-management and data-sync facilities. The administration facility 130 itself includes several components, including a monitoring component 135, a health-check component 140, and an operational-control component 145.

The monitoring component 135 displays in near-real-time the current states of applications, resources and events in the database systems $105_{1-2}$. To do so, the monitoring component 135 accesses state information that is stored in each of the database systems in a manner that makes the state information independent of system-component availability. In other words, the two database systems $105_{1-2}$ store the state information in a manner which ensures that the monitoring component 135 is able to access the state information even when certain critical system components are down. The monitoring component 135 and the data-sync facility 125 work together to ensure that all of the state information stored in the two database systems $105_{1-2}$ is kept in synch in near-real-time. Synchronizing the state information in this manner ensures that the database systems $105_{1-2}$ are able to provide high availability even when one of the systems is unavailable for some reason, such as for system failure or routine maintenance.

The monitoring component 135 displays three primary types of information:
1) Process-level information, including information on return codes and time windows for batch processes;
2) Component-level information, including state information for critical systems and processes in the multiple-active system; and
3) Data-level information, including information on the data-synchronization state of the database systems and on the sync processes for individual tables.

The health-check component 140 monitors the data integrity between the database systems $105_{1-2}$. Every so often (for example, upon completion of a batch job), the health-check component 140 chooses a column of data from a table in one of the systems and sums the data values in that column to create a health-check number. The health-check component 140 then repeats this task on the corresponding column in the other system and compares the two health-check numbers. If the two numbers do not match, the database copies stored in the two systems are not in synch, and the data-sync facility 125 takes corrective action.

The operational-control component 145 works in conjunction with the workload-management facility 110 in attending to all operational aspects of system management, such as workload balancing and request routing, during both planned and unplanned periods of system unavailability. The operational-control component 145 ensures the performance of all tasks necessary for data availability and consistency when one of the database systems goes down. This component also manages system resources when either of the systems undergoes changes from normal operations to system maintenance to system failures. Among other things, the operational-control component 145 executes a set of procedures that allows management of the multiple-active system through shutdown, repair and startup during both planned and unplanned outages in one of the database systems. These procedures include:
(1) Switching operation of a single application from one of the database systems to the other;
(2) Switching operation of all applications from one of the database systems to the other; and
(3) Starting or stopping an application on one of the database systems.

Figure 2:
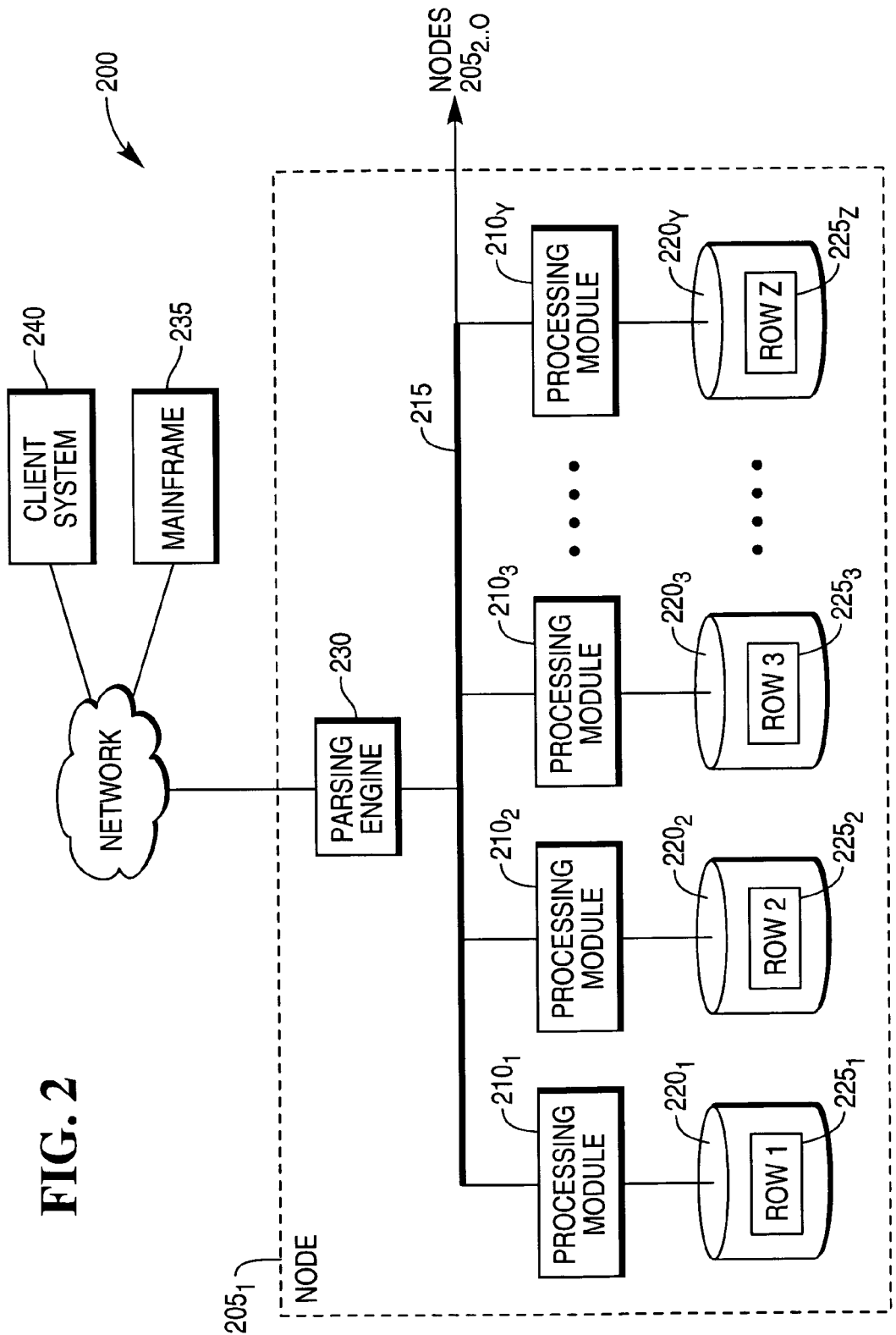
FIG. 2 is a schematic diagram of a database system built on a massively parallel processing (MPP) platform.

The multiple-active system 100 of FIG. 1 is often implemented with very large database systems that contain many billions or even trillions of records in some tables, like the database system 200 ("DBS") shown in FIG. 2. One such database system is the Teradata Active Data Warehousing System available from NCR Corporation. FIG. 2 shows a sample architecture for one node $205_1$ of such a database system 200. The DBS node $205_1$ includes one or more processing modules $210_{1 \ldots N}$, connected by a network 215, that manage the storage and retrieval of data in data-storage facilities $220_{1 \ldots N}$. Each of the processing modules $210_{1 \ldots N}$ may be one or more physical processors, or each may be a virtual processor, with one or more virtual processors running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there were, for example, four virtual processors and four physical processors, then typically each virtual processor would run on its own physical processor. If there were eight virtual processors and four physical processors, the operating system would schedule the eight virtual processors against the four physical processors, in which case swapping of the virtual processors would occur.

Each of the processing modules $210_{1 \ldots N}$ manages a portion of a database that is stored in a corresponding one of the data-storage facilities $220_{1 \ldots N}$. Each of the data-storage facilities $220_{1 \ldots N}$ includes one or more disk drives. In most embodiments, the database system 200 includes multiple-nodes $205_{2 \ldots O}$ in addition to the illustrated node $205_1$, all connected together through an extension of the network 215.

The database system 200 as shown here stores data in one or more tables in the data-storage facilities $220_{1 \ldots N}$. The rows $225_{1 \ldots Z}$ of the tables are stored across multiple data-storage facilities $220_{1 \ldots N}$ to ensure that the system workload is distributed evenly across the processing modules $210_{1 \ldots N}$. A parsing engine 230 organizes the storage of data and the distribution of table rows $225_{1 \ldots Z}$ among the processing modules $210_{1 \ldots N}$. The parsing engine 230 also coordinates the retrieval of data from the data-storage facilities $220_{1 \ldots N}$ in response to queries received from a user at a mainframe 235 or a client computer 240. The DBS 200 usually receives queries and commands to build tables in a standard format, such as SQL.

In some systems, the rows $225_{1 \ldots Z}$ are distributed across the data-storage facilities $220_{1 \ldots N}$ by the parsing engine 230 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $220_{1 \ldots N}$ and associated processing modules $210_{1 \ldots N}$ by a hash bucket map. The characteristics of the columns chosen for the primary index determine how evenly the rows are distributed.

Figure 3:
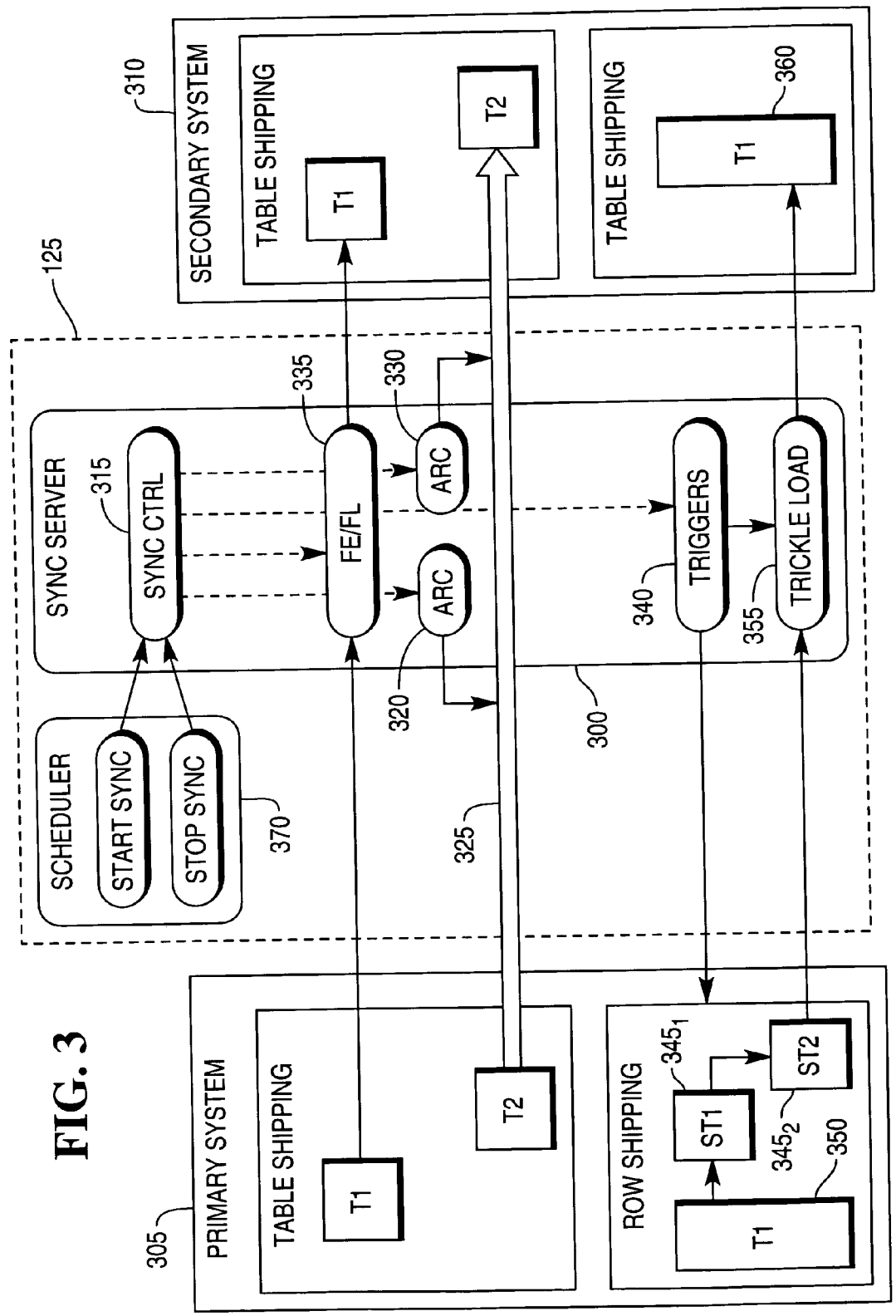
FIG. 3 is a schematic diagram of a data-synchronization facility.

FIG. 3 shows the data-sync facility 125 (FIG. 1) in more detail. The data-sync facility 125 includes a synchronization server (or "sync server") 300 that ensures the synchronization of data between the multiple-active database systems $105_{1-2}$ (FIG. 1) when changes occur to the data stored in one or both of the systems. As shown here, for each data-sync operation, the data-sync facility 125 treats one of the database systems as a "primary" system 305 and the other as a "secondary" system 310 for purposes of the data-sync operation. In some embodiments, one of the database systems is permanently designated as the primary system, while the other is permanently designated as the secondary system, in which case the data-sync facility must occasionally synchronize data from the secondary system into the primary system (i.e., the flow of the data-sync operation would be opposite that shown in FIG. 3).

The sync server 300 includes a sync controller 315 that initiates, terminates, and manages the sync operation. In some alternative embodiments, a scheduler utility 370 initiates and terminates the sync operation, working in conjunction with the sync server 315. Sync operations are typically performed according to some predetermined schedule. In some cases, sync operations are event driven, taking place upon the occurrence of some important event, such as a batch load operation into one of the database systems. In some embodiments, a database administrator is able to manually initiate and terminate sync operations. In each of these cases, the sync controller 315 in the sync server 300 accesses a table that indicates which database tables are in need of synchronization and which synchronization method (described below) is to be used.

The sync server 300 carries out each sync operation using one of three possible methods. In some systems, the sync server 300 is capable of carrying out all three of these methods, and in other systems only some subset of the three. The first method is a table-level method that involves the synchronization of an entire database table using, for example, a traditional archive utility 320 (such as the Teradata "ARC DUMP" utility) to move the table from the primary system 305 to a named pipe 325 (or to a flat file or other storage mechanism for asynchronous copying). A traditional restore utility 330 (such as the Teradata "ARC COPY" utility) is then used to move the table from the named pipe 325 (or the flat file) to the secondary system 310. In some cases, the restore utility 330 is also used to move multiple tables, or even an entire database, at once.

The second data-sync method is also a table-level method, one that involves the use of a traditional unload utility 335 and load utility 337 (such as the Teradata "FASTEXPORT" and "FASTLOAD" utilities) to move an entire table from the primary system 305 to the secondary system 310 through, e.g., a named pipe or flat file. In both of these table-level methods, the unload and load utilities move the data, and the sync server 300 creates indexes and collects statistics for the affected tables on the secondary system and then stores this information in the secondary system.

The third data-sync method is a row-level method known as "row shipping." With this method, a trigger 340 in the primary system 305 collects in an initial "shadow table" $345_1$ (ST1) all changes that are made to a base table 350 in the primary system 305. Then, at periodic intervals, the sync server 300 transports these changes to the corresponding base table 360 in the secondary system 310 by: (1) locking the initial shadow table $345_1$, (2) moving all rows of the shadow table $345_1$ into a second shadow table $345_2$ (ST2), (3) unlocking the initial shadow table $345_1$, (4) exporting the data from the second shadow table $345_2$ to a file 375 or process using a traditional unload or extract utility 355 (such as Teradata "FASTEXPORT" and "BTEQ" utilities), and (5) loading the data from the file 375 into the target system using a traditional load utility 380 (such as the Teradata "TPump" utility).

Figure 4A:
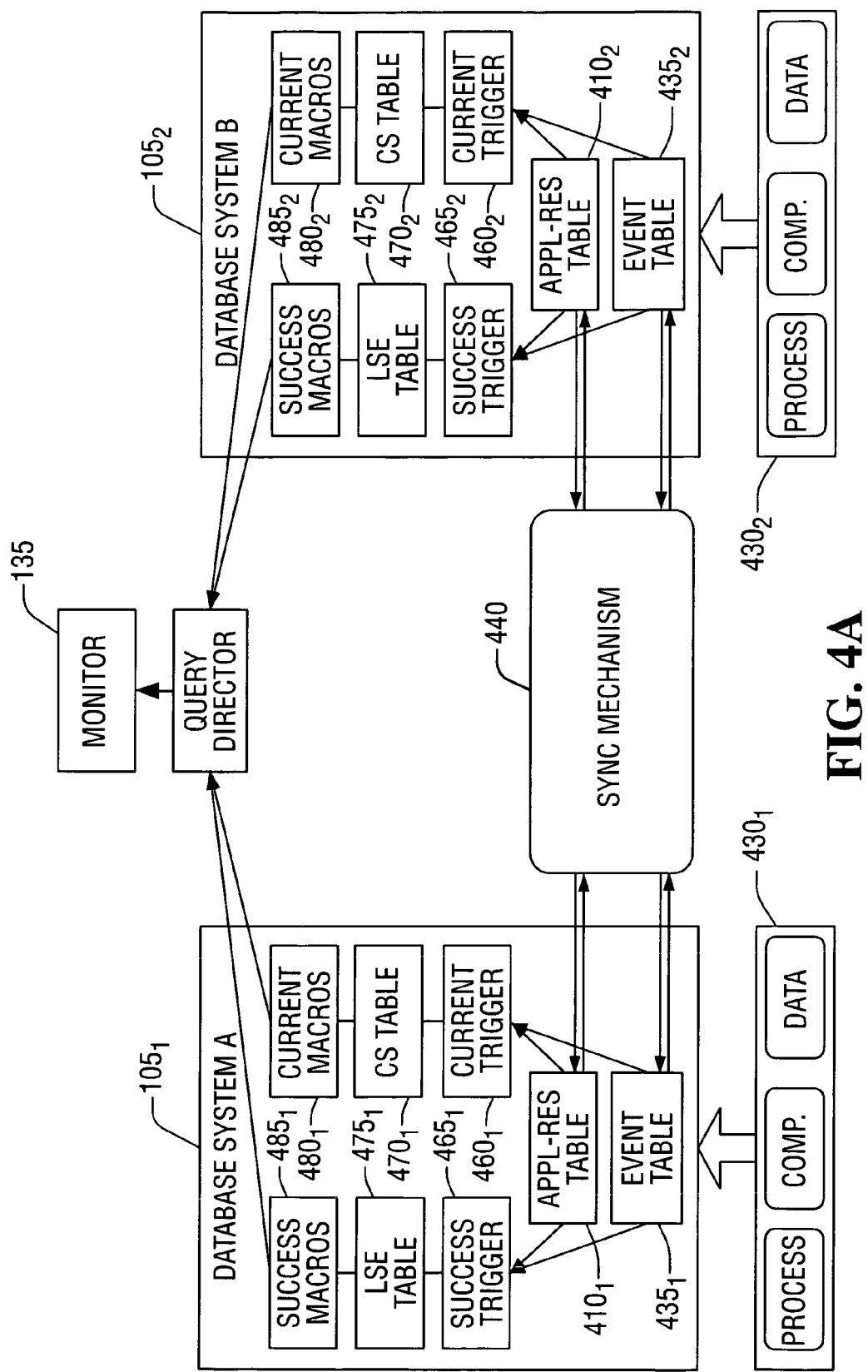
FIGS. 4A and 4B are schematic diagrams showing interaction between a monitoring component of an administration facility and multiple active database systems.
Figure 4B:
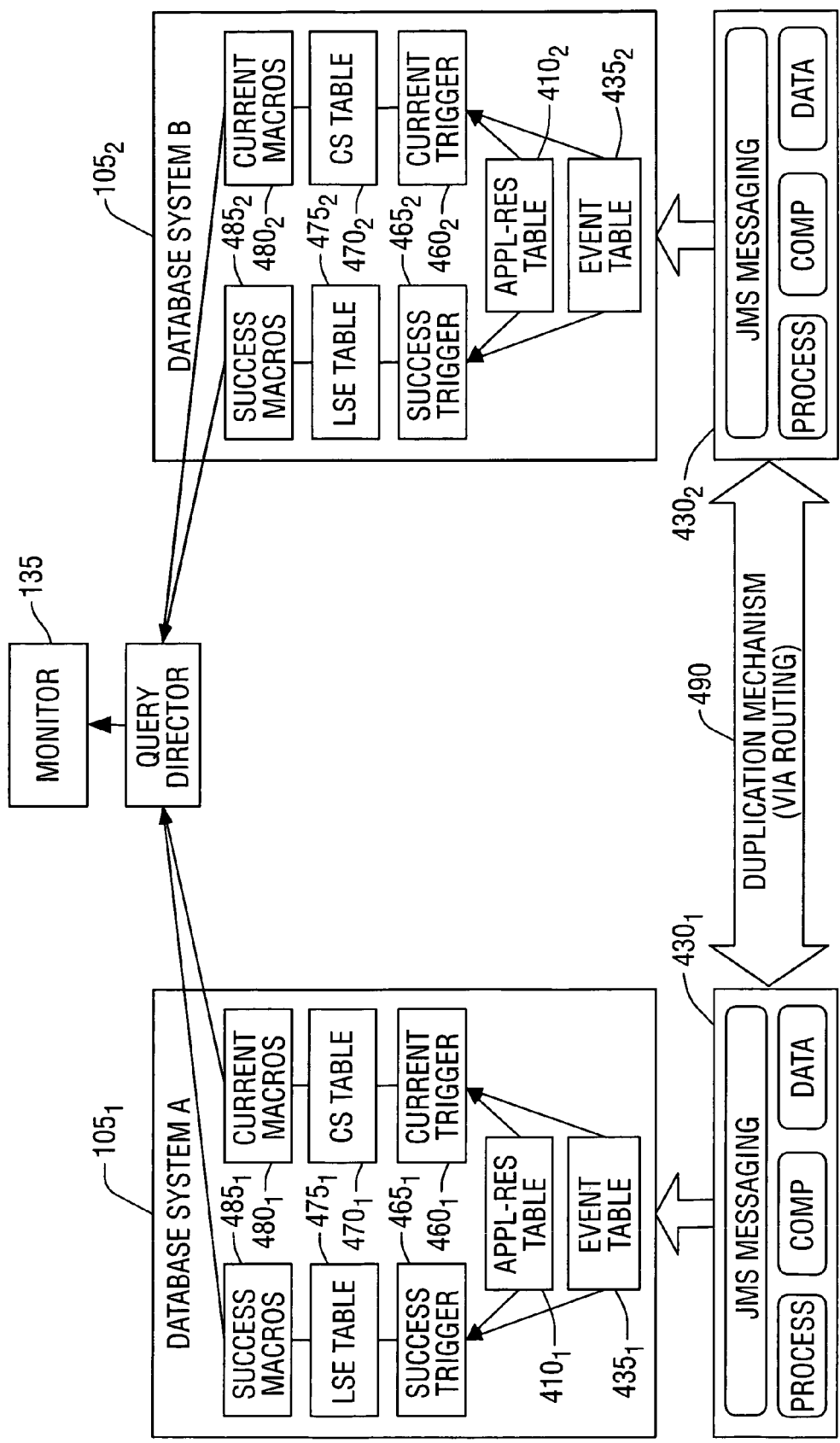

FIGS. 4A and 4B show the monitoring component (or "monitor") 135 (FIG. 1) of the administration facility 130 and its interaction with the database systems $105_{1-2}$ in more detail. The monitor 135 displays information from individual multiple-active system resources about the processes, components and data states associated with those resources. This information is delivered in a visual display to a human administrator or to an automated control component for use in managing the multiple active database systems. This information typically comes from any of a variety of monitoring sources, including off-the-shelf enterprise monitoring consoles (such as the BMC Patrol product), events from batch processes, and events from the data-synchronization process described above.

As described below, the monitor 135 works in conjunction with the various system components of the multiple-active database systems $105_{1-2}$ to watch for critical events that lead to state changes at the application and resource levels. The monitor 135 displays information about these changes as they cascade through a series of local tables found within each of the database systems.

In general, state changes result from the occurrence of critical events within and outside of the database systems $105_{1-2}$. These critical events often occur in the normal course of system operation during processes such as trickle loads, batch jobs, data synchronization, system-health checks, and watchdog monitoring. Examples of critical events include the start or completion of a batch job, the failure of a load job, and the occurrence of abnormal query-response times in the database systems $105_{1-2}$.

As critical events occur among the set of resources $430_{1-2}$ associated with the database systems $105_{1-2}$, the events are captured locally in event tables $435_{1-2}$ found in the database systems. Each of the event tables $435_{1-2}$ has associated triggers—including a "current" trigger $460_{1-2}$ and a "success" trigger $465_{1-2}$—which capture state changes from each of the event tables $435_{1-2}$ into two other tables, both of which preserve system-state information in the corresponding one of the database systems. In each of the database systems, one of these tables—the "current status" table $470_{1-2}$—maintains the current state of every resource associated with the database system. The other of these tables—the "last successful event" table $475_{1-2}$—maintains the last successful event for each resource associated with the database system.

The "current" triggers $460_{1-2}$ and "success" triggers $465_{1-2}$ ensure that changes to the lower-level event tables $435_{1-2}$ cascade automatically to the higher-level "current status" tables $470_{1-2}$ and "last successful event" tables $475_{1-2}$. As a result, by ensuring that the two event tables $435_{1-2}$ are synchronized, the monitor 135 ensures that both database systems $105_{1-2}$ have access to the identical system-state information at all times.

In interacting with the database systems $105_{1-2}$, the monitor 135 executes a set of macros—including "current" macros $480_{1-2}$ and "success" macros $485_{1-2}$—that query the tables residing in the database systems $105_{1-2}$. These tables include not only the event tables $435_{1-2}$, "current status" tables $470_{1-2}$, and "last successful event" tables $475_{1-2}$ described above, but also application-resource tables $410_{1-2}$, within which each application is mapped to a set of one or more system resources on which it depends. The system resources in turn are each mapped to one of three resource types—component, data and process.

When the "current" macros and "success" macros are called by the monitor 135, the macros access the various tables in the database systems $105_{1-2}$, retrieving job-start and job-duration threshold values for certain system resources $430_{1-2}$. These threshold values indicate when certain events should occur at the resources $430_{1-2}$ and how long those events should take place. When the macros conclude that a threshold value has not been met, the monitor 135 causes a change in the appearance of a graphical display that is rendered for the benefit of a database administrator. For example, when an event occurs at a particular system resource, the portion of the graphical display depicting the resource might change color (e.g., from green to yellow to red), as will the portions depicting any applications that depend from the resource.

FIGS. 4A and 4B show two alternative architectures for ensuring that each of the database systems has access to the same system-state information. FIG. 4A shows a system in which a synchronization mechanism (or "sync mechanism") 440 watches for changes to the event tables $435_{1-2}$ and, when changes occur, ships the changes between the database systems $105_{1-2}$ to ensure synchronization of the tables. The sync mechanism 440 typically ships these changes at the row level, using the row-shipping technique described in connection with the data-sync facility 125 above. In some systems, the sync mechanism 440 is carried out by the data-sync facility 125. The sync mechanism 440 in this example is a bidirectional mechanism, allowing changes in either of the database systems to be shipped to the other system for synchronization.

FIG. 4B shows a system in which a duplication mechanism 490 receives messages from the components, processes, data, or events in each of the database systems and routes them to the event tables $435_{1-2}$ and application-resource tables $410_{1-2}$ in both of the database systems. The duplication mechanism 490 typically ships these changes at the row level, using a multiple-publisher/multiple-subscriber messaging approach, such as that enabled by the Java Messaging Service (JMS) protocol. The duplication mechanism 490 in this example is a bidirectional mechanism, allowing changes in either of the database systems to be duplicated to the other system.

Figure 5:
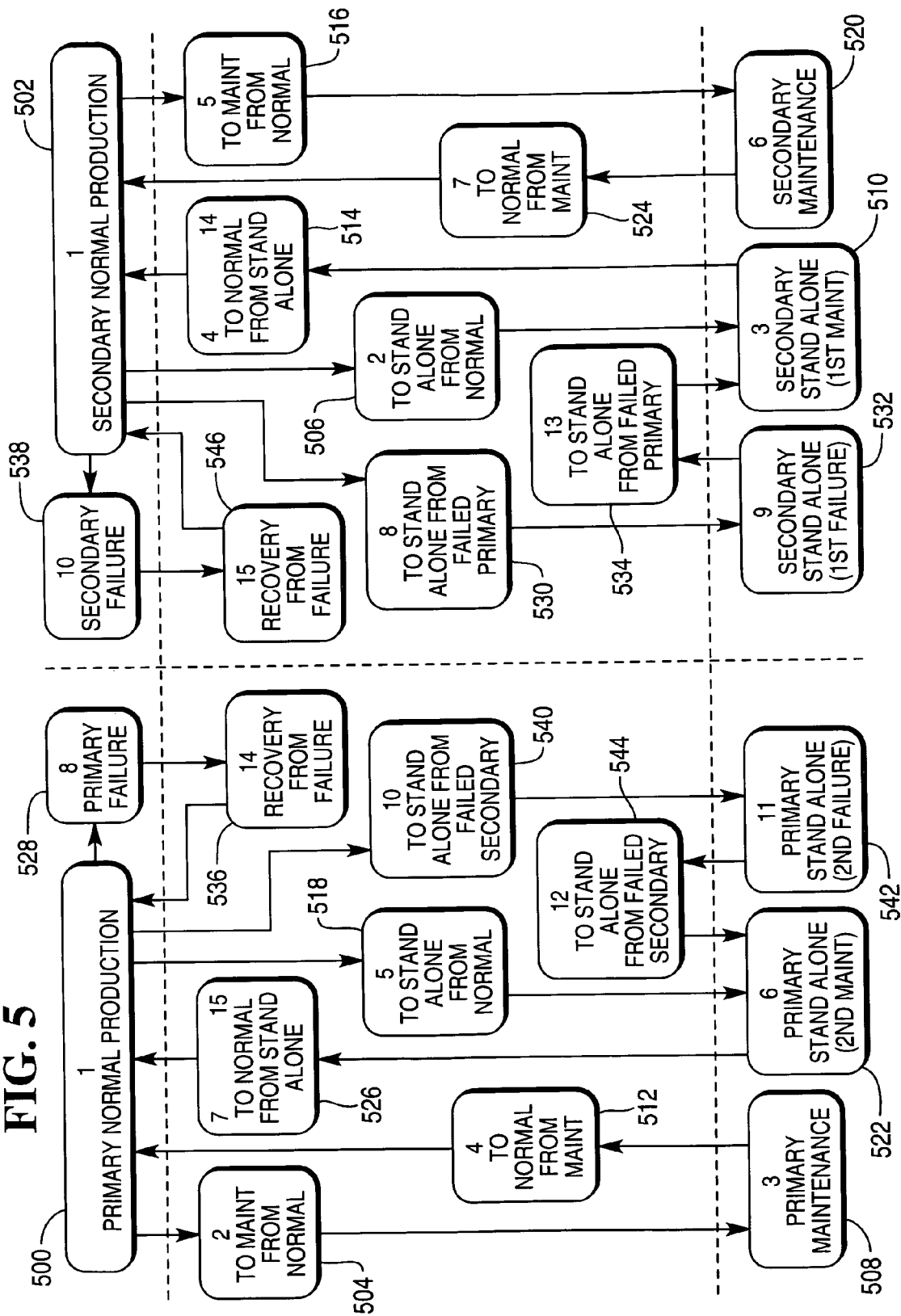
FIG. 5 is a state-transition diagram for moving from a multiple-active environment to a single-active environment and back again.

FIG. 5 shows a state-transition diagram for moving from a multiple-active environment to a single-active environment and back again when one of the database systems $105_{1-2}$ suffers a failure or is taken down for maintenance. The state transitions shown in this diagram are managed by the operational-control component 145 (FIG. 1) of the administration facility 130. Operational procedures executed by the operational-control component 145 manage each transition from one state to another and guarantee that each series of transitions is completed properly.

The state-transition diagram of FIG. 5 shows both steady states and transitional states for the multiple-active system. The steady states that are associated with a multiple-active environment lie above the upper dashed line, and those associated with a single-active environment lie below the lower dashed line. The transitional states all lie between the dashed lines. In this diagram the transitional states occur in pairs, indicating that both of the database systems in a multiple-active system will undergo a fully synchronized process in moving from one state to another.

Under normal operating conditions (state 1), both of the database systems (the primary and secondary systems) are active and available to process requests (blocks 500 & 502). When the primary system is to be taken down for maintenance, the system enters a transitional state (state 2) during which the primary system is taken from normal production mode to maintenance mode (block 504) and the secondary system is taken from normal production mode to stand-alone mode (block 506). Once this transition is complete, the system enters a single-active steady state (state 3) in which the primary system remains in maintenance mode (block 508) and the secondary system remains in stand-alone mode (block 510).

When the maintenance operation on the primary system is complete, the system enters another transitional state (state 4) in which the primary system is taken from maintenance mode to normal production mode (block 512) and the secondary system is taken from stand-alone mode to normal production mode (block 514). When this transition is complete, the system returns to the multiple-active steady state (state 1; blocks 500 and 502).

A similar set of transitions occurs when the secondary system is taken down for maintenance. In particular, the system first enters a transitional state (state 5) in which the secondary system is taken from normal production mode to maintenance mode (block 516) while the primary system is taken from normal production mode to stand-alone mode (block 518). At the completion of this transition, the system enters a single-active steady state (state 6) in which the secondary system remains in maintenance mode (block 520) and the primary system remains in stand-alone mode (block 522).

As before, when the maintenance operation on the secondary system is complete, the system enters another transitional state (state 7) in which the secondary system is taken from maintenance mode to normal production mode (block 524) and the primary system is taken from stand-alone mode to normal production mode (block 526). When this transition is complete, the system returns to the multiple-active steady state (state 1; blocks 500 and 502).

When the operational-control component 145 detects a failure in the primary system (block 528), the system enters a transitional state (state 8) during which the secondary system is taken from normal production mode to stand-alone mode (block 530). When this transition is complete, the system enters a temporary single-active steady state (state 9) in which the secondary system is in stand-alone mode as a result of primary failure (block 532). In this steady state, the administration facility 130 checks the health of the secondary system and begins reassigning the workload of the primary system to the secondary system. When the administration facility 130 has finished moving all tasks to the secondary system, the system enters another transitional state (state 13), during which the secondary system is taken from stand-alone mode as a result of primary failure to stand-alone mode for primary maintenance (block 534). When this transition is complete, the system enters the single-active steady state (state 3) in which the secondary system remains in stand-alone mode for primary maintenance (510).

From this point, the system treats the primary system as though it is in maintenance mode until the primary system has recovered from failure. When the primary system finally recovers from failure, the system enters another transitional state (state 14), during which the primary system is taken from failure mode to normal production mode (block 536) and the secondary system is taken from stand-alone mode to normal production mode (block 514). When this transition is complete, the system returns to the multiple-active steady-state (state 1; blocks 500 and 502).

The procedure upon detecting a failure in the secondary system (block 538) is the same. In particular, the system enters a transitional state (state 10) during which the primary system is taken from normal production mode to stand-alone mode (block 540). When this transition is complete, the system enters a temporary single-active steady state (state 11) in which the primary system is in stand-alone mode as a result of secondary failure (block 542). In this steady-state, the administration facility 130 checks the health of the primary system and begins reassigning the workload of the secondary system to the primary system. When the administration facility 130 has finished moving all tasks to the primary system, the system enters another transitional state (state 12) during which the primary system is taken from stand-alone mode as a result of secondary failure to stand-alone mode for secondary maintenance (block 544). When this transition is complete, the system enters the single-active steady state (state 6) in which the primary system remains in stand-alone mode for secondary maintenance (522).

From this point, the system treats the secondary system as though it is in maintenance mode until the secondary system has recovered from failure. When the secondary system finally recovers from failure, the system enters another transitional state (state 15), during which the secondary system is taken from failure mode to normal production mode (block 546) and the primary system is taken from stand-alone mode to normal production mode (block 526). When this transition is complete, the system returns to the multiple-active steady-state (state 1; blocks 500 and 502).

For each state transition in this diagram, the operational-control component 145 executes an associated set of procedures to make the transition from one state to another. Below is a sample set of procedures for one such state transition, the one that takes the primary system from normal production mode to maintenance mode (from steady state 1 to transitional state 2 to steady state 3).

1. Table-ship any planned tables to the secondary system
2. Ensure that any loads to the primary system are up-to-date
3. Ensure that any loads to the secondary system are up-to-date
4. Stop all loads on the primary system
5. Freeze both systems for DDL and DCL changes
6. Stop all updates, inserts, and deletes on the primary system
7. Revoke insert/update/delete access rights for public on the primary system
8. Apply any last-minute updates, inserts, and deletes to the secondary system using the data-sync facility
9. Table-ship any required critical tables to the secondary system
10. Trigger-ship the sync-master table to the secondary system
11. Stop all sync processes
12. Grant insert/update/delete access rights for public on the secondary system
13. Switch the Query Manager Profile to "Primary Maintenance" and "Secondary Stand-alone Maintenance"
14. Switch Priority Scheduler Profiles to "Primary Maintenance" and "Secondary Stand-alone for Primary Maintenance"
15. Switch views to allow updates/inserts/deletes on the secondary system
16. Switch Query Director Profiles to "Primary Maintenance" and "Secondary Stand-alone for Primary Maintenance"
17. Take down the primary system for maintenance
18. Disable logons on the primary system for all but maintenance IDs
19. Set the state of the primary system to PM (Primary Maintenance)
20. Set the state of the secondary system to SS (Secondary Stand-alone)

Figure 6:
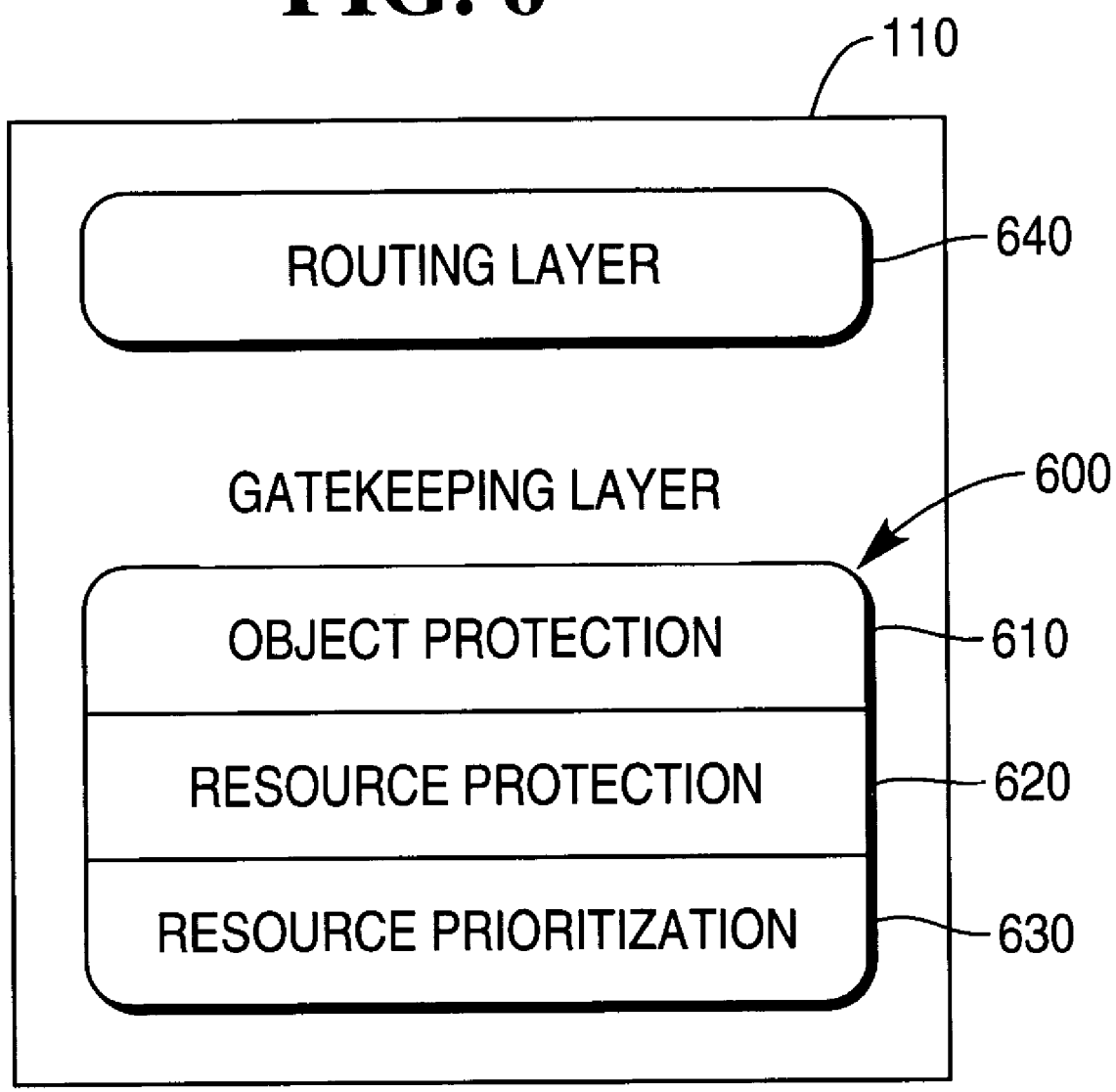
FIG. 6 is a schematic diagram of a workload-management facility.

FIG. 6 shows the workload-management facility 110 (FIG. 1) in more detail. The primary routing scheme followed by the workload-management facility 110 is a simple user-ID or account-ID-based system, in which the facility consults a routing definition table (described above) to identify which of the active database systems should receive an incoming request. In order for a database system to qualify as an "active" system, the data it stores must be in-place, accessible, and up-to-date, and it must have sufficient free resources to support the request. If for any reason a database system cannot execute a request that targets it, the request fails on that database system. If the request qualifies for execution on another system, it is delivered to the other system for execution.

In addition to or instead of the simple user-ID or account-ID-based routing system described above, the workload-management facility 110 relies on a two-layer architecture to balance the workload across the database systems in the multiple-active environment. The lower layer is a gate-keeping layer 600, which itself includes three sub-layers: (1) an object-protection layer 610, a resource-protection layer 620, and a resource-prioritization layer 630. The upper layer of this workload-management architecture is a routing layer 640, which is described in more detail below.

The object-protection layer 610 allows a database administrator (DBA) to participate in the management of workloads across the multiple-active system. Object protection is a relatively static approach to workload management that allows the DBA to configure database applications for execution in the multiple-active environment. Through the object-protection layer 610, the DBA defines database objects (and manages access rights for those objects) that are required to support an application only on those database systems for which the application is to be supported. The DBA does so using traditional SQL statements, such as CREATE, DROP, GRANT, and REVOKE.

Figure 7:
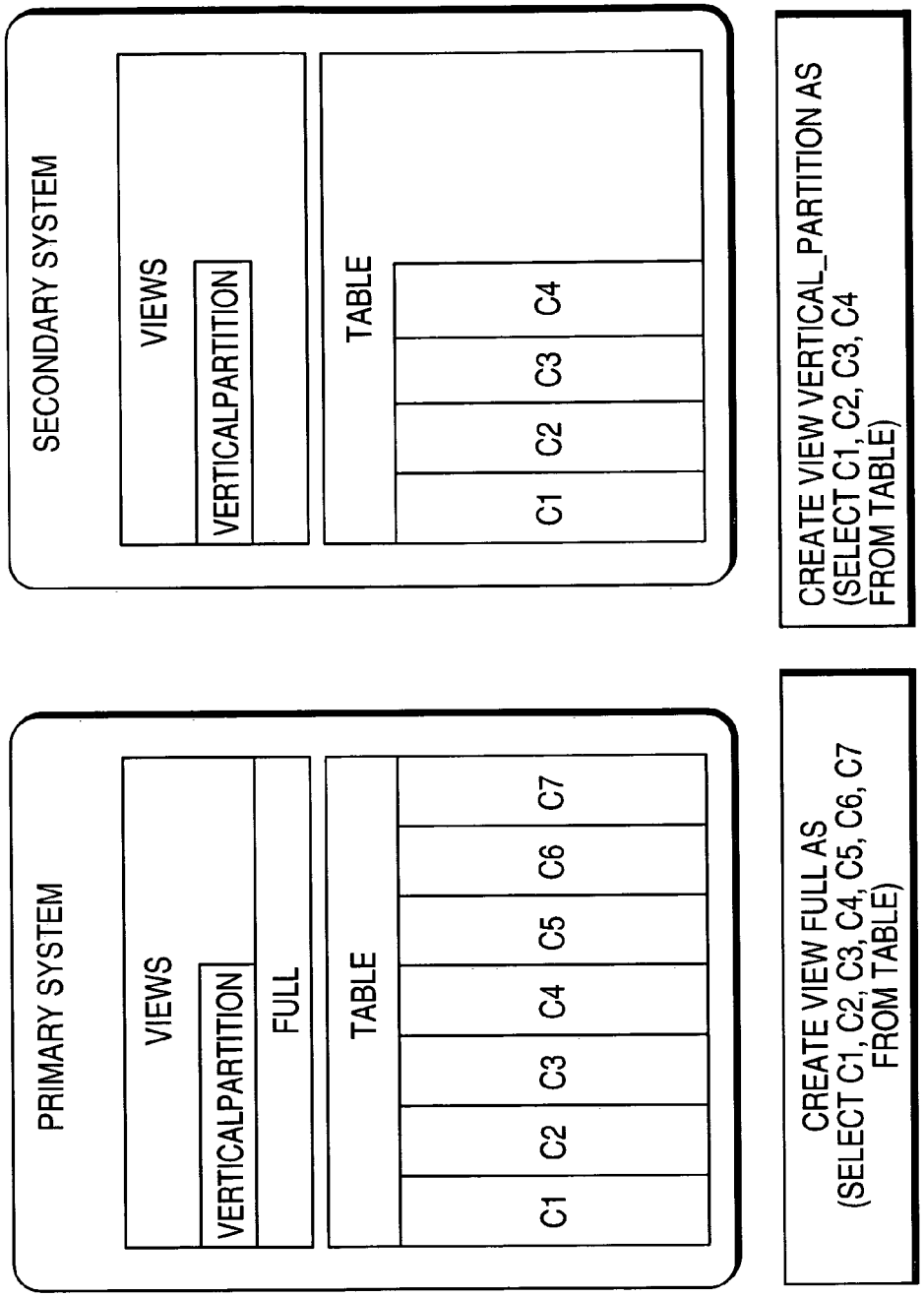
FIGS. 7 and 8 illustrate a vertical/horizontal partitioning scheme.
Figure 8:
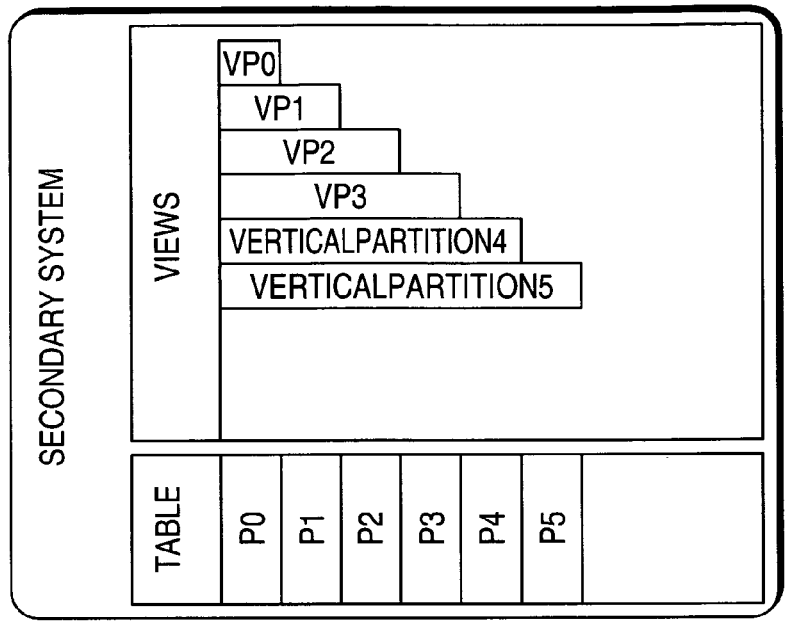
Figure 8:
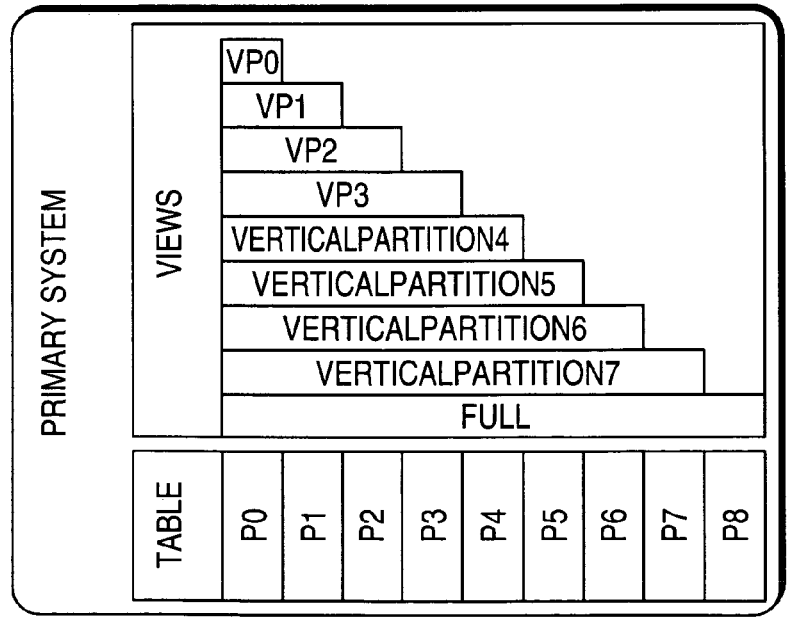

The object-protection layer 610 also allows the DBA to implement vertical/horizontal partitioning of tables between database systems when the tables do not have the same number of columns or the same history depth in both database systems, typically as a result of the DBA's object-protection assignments. FIGS. 7 and 8 show one example of a vertical/horizontal partitioning scheme for a database table that has seven columns in one database system (the primary system) and only four columns in the other system (the secondary system). The DBA has partitioned the table vertically along the seven columns (FIG. 7) and has created two separate views to allow access to the tables in both systems. One of these views—a FULL view—allows a user to view all seven columns in the table and is available only through the primary system. The other view—a VERTICLE_PARTITION view—allows the user to view only the four columns that appear in both database systems and thus is available through both systems.

The resource-protection layer 620 allows semi-automated management of workloads in the database systems by combining DBA-specified controls with automatic processes. Among the controls managed by the DBA are system-access rules (i.e., rules that govern which applications can access which of the database systems) and size filters (i.e., estimates of the amount of resources required to complete each individual request from each of the applications). Automated controls include enabling/disabling rules (i.e., workload-management rules to enable or disable the delivery of requests to the database systems) and operational procedures like those implemented in the operational-control component 145 (FIG. 1) of the administration facility 130 (e.g., taking a system down for maintenance).

The resource-prioritization layer 630 implements system-level rules to manage the distribution of database resources among workload tasks. This layer is typically implemented in a traditional priority-scheduler tool and is used primarily to ensure a balance between the critical work to be done in the database systems and the dynamic user workload faced by the systems.

The upper layer of the workload-management architecture is the routing layer 640. The routing layer 640 uses predefined routing rules to identify all database systems that can support each incoming request. A predefined selection scheme, such as a weighted round-robin scheme, is used to select one of the database systems as the target system to receive the request. The routing layer 640 then routes the request to the target system through the various levels of the gate-keeping layer 600. If the target system is able to process the request successfully, the target system returns a result set to the workload-management facility 110, which in turn delivers the result set to the user who submitted the request. If, on the other hand, the gatekeeper layer 600 returns an error message, the routing layer 640 selects another of the qualified systems as the target system and attempts to deliver the request to that system. The process continues until the routing layer 640 finds a database system that is able to process the request successfully. If none of the database systems is able to process the request, an error message is returned to the user.

Figure 9:
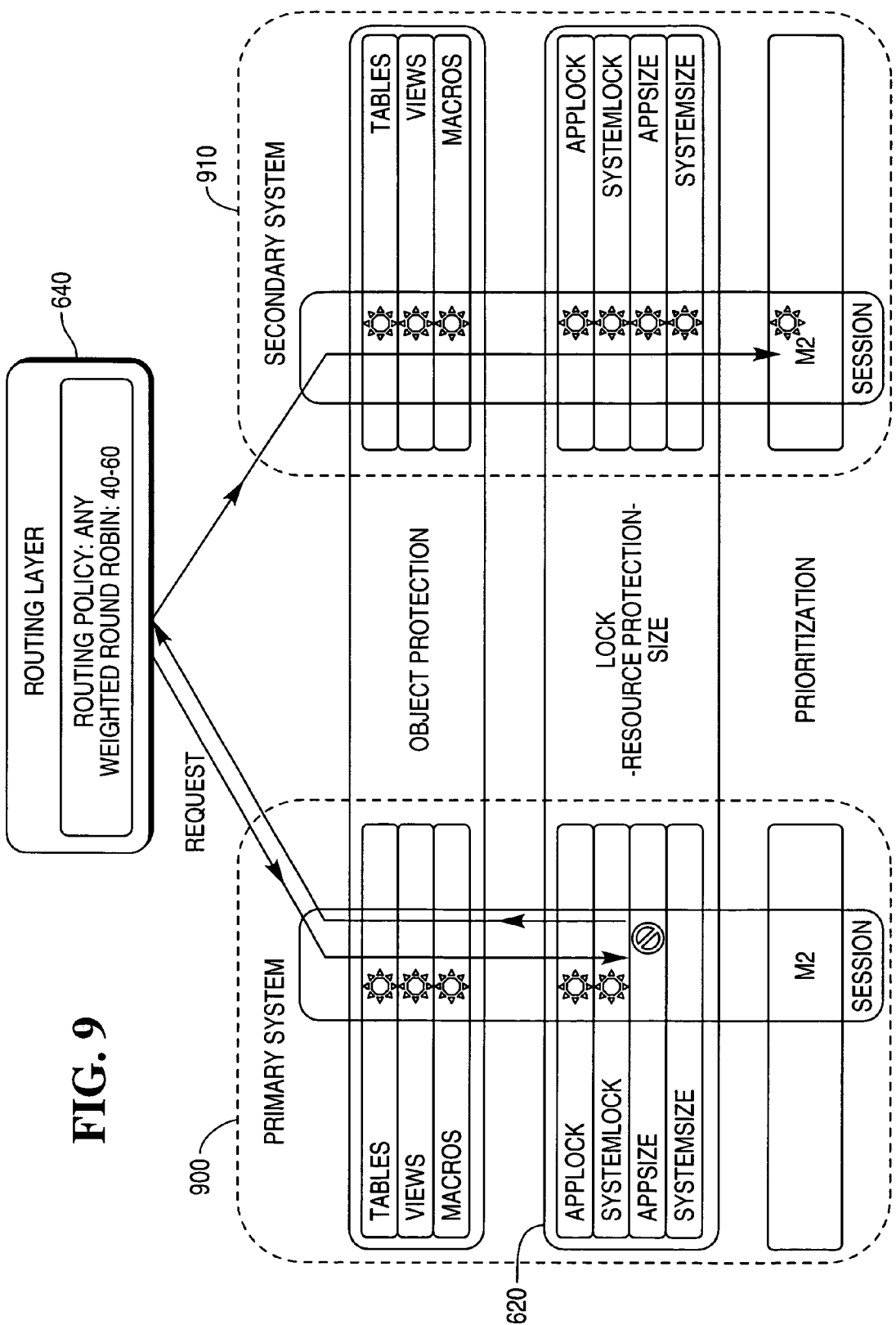
FIG. 9 is a schematic diagram showing the various layers in the workload-management facility of FIG. 6.

FIG. 9 shows one example in which the routing layer 640 first attempts to deliver a request to a primary system 900 but receives an error message from the resource-protection sublayer 620 in the primary system. The routing layer 640 then attempts to deliver the request to the secondary system. In this example, the secondary system is able to complete the request successfully.

Computer-based and Other Implementations

The various implementations of the invention are realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. For example, while the invention has been described in terms of multiple-active database systems, the invention is suited for implementation in a multiple-active environment with virtually any number of database systems. Many other embodiments are also within the scope of the following claims.

We claim:

1. A method for use in managing operation of at least two database systems that both store a common portion of a relational database and that are configured to share a database workload against that relational database, the method comprising:

receiving indication that a first one of the database systems is ceasing operation; and, in response taking a second one of the database systems to an operational state in which at least a portion of the database workload that is scheduled to be carried out by the first database system is transferred to the second database system;

where receiving indication that the first database system is ceasing operation includes receiving indication that the first database is ceasing operation as a result of an unplanned shutdown, and in response:

taking the second database system to a second operational state in which it carries out the portion of the database workload transferred to it in addition to at least some portion its own portion of the database workload and stores information indicating that the first database system ceased operation as a result of an unplanned shutdown; and then taking the second database system to a third operational state in which it continues to carry out the portion of the database workload transferred to it in addition to at least some portion its own portion of the database workload and stores information indicating that the first database system ceased operation as a result of a planned shutdown.

2. The method of claim 1, further comprising:

receiving indication that the first database system is resuming operation; and, in response taking the second database system to a fourth operational state in which at least a portion of the transferred workload is transferred back to the first database system.

3. The method of claim 2, further comprising taking the second database system to an operational state in which the first and second database systems again share the database workload.

4. A system comprising:

(a) at least two database systems that both store a common portion of a relational database and that are configured to share a database workload against that relational database; and (b) a system-management component configured to receive indication that a first one of the database systems is ceasing operation and, in response, take a second one of the database systems to an operational state in which at least a portion of the database workload that is scheduled to be carried out by the first database system is transferred to the second database system;

where the system-management component, in receiving indication that the first database system is ceasing operation, is configured to receive indication that the first database is ceasing operation as a result of an unplanned shutdown, and in response:

take the second database system to a second operational state in which it carries out the portion of the database workload transferred to it in addition to at least some portion of its own portion of the database workload and stores information indicating that the first database system ceased operation as a result of an unplanned shutdown; and then take the second database system to a third operational state in which it continues to carry out the portion of the database workload transferred to it in addition to at least some portion of its own portion of the database workload and stores information indicating that the first database system ceased operation as a result of a planned shutdown.

5. The system of claim 4, where the system-management component is subsequently configured to receive indication that the first database system is resuming operation and, in response, take the second database system to a fourth operational state in which at least a portion of the transferred workload is transferred back to the first database system.

6. The system of claim 5, where the system-management component is subsequently configured to take the second database system to an operational state in which the first and second database systems again share the database workload.

* * * * *